United States Patent [19]
Alexson

[11] 3,971,338
[45] July 27, 1976

[54] AQUARIUM APPARATUS
[75] Inventor: Peter Charles Alexson, Anaheim, Calif.
[73] Assignee: Sea Life Exhibits, Inc., Anaheim, Calif.
[22] Filed: Jan. 30, 1975
[21] Appl. No.: 545,611

[52] U.S. Cl. .................................................. 119/5
[51] Int. Cl.² ........................................ A01K 63/00
[58] Field of Search........................ 119/5; 210/169

[56] References Cited
UNITED STATES PATENTS

| | | |
|---|---|---|
| 3,465,718 | 9/1969 | Handman et al. .................. 119/5 X |
| 3,616,919 | 11/1971 | Feddern et al...................... 210/169 |
| 3,640,391 | 2/1972 | Carpenter, Jr..................... 210/196 |
| 3,731,090 | 5/1973 | Veloz..................................... 119/5 |
| 3,855,970 | 12/1974 | Harwood .............................. 119/5 |

Primary Examiner—Hugh R. Chamblee
Attorney, Agent, or Firm—Grover A. Frater

[57] ABSTRACT

An aquarium system is made self contained, even for salt water, by providing it with a sub-gravel filter in series with a carbon filter, and ultra-violet sterilizer and a temperature control unit, and a water withdrawal and return that insures circular flow in the tank. The system includes a means for introducing outside air into the filter circulation system, advantageously at a point just prior to reintroduction of the filtered water to the tank. Capability of the system to provide an environment in which long-time survival of sensitive fish and invertebrates is made possible by the addition of an air stripper unit in parallel with the sub-gravel filter. The air stripper and the ultra-violet sterilizer are specially constructed to enhance the operation of the system.

4 Claims, 5 Drawing Figures

AQUARIUM APPARATUS

This invention relates to aquarium apparatus, and it relates particularly to systems and apparatus for keeping marine life alive in captivity for indefinitely long periods.

The invention provides improvements that are applicable both to the keeping of fresh water and salt water aquatic life. The problems in establishing and maintaining an adequate fresh water aquarium system are far less complex than those that attend the establishment and maintenance of an adequate salt water environment. Most of the fresh waters of the earth in which fish live experience temperature and composition changes with seasons and with depth and local weather conditions. In general, the fish that live in fresh water have learned to adapt and can readily withstand wide changes in such variables. That is not true in the case of marine life. The chemical composition of the oceans vary in slight degree. While the ocean temperature varies from place to place, the range of temperatures which are experienced in any particular place is very limited. As a consequence, salt water animals are much less adaptive. There are a few hardy specimens, but for the most part, both the hobbyist and the scientist has learned to expect that his specimens will have limited life in any but the large aquarium systems that involve a means to utilize a flow of water from the sea.

The difficulty lies, not in maintaining water temperature, but rather in maintaining a proper water chemistry. Using heating or refrigeration apparatus makes it easy to maintain water temperature at the value to which the specimens are accustomed. On the other hand, attempts to reproduce ocean water chemistry in small aquarium systems have consistently ended in failure. It is not feasible to limit the amount of life in a small aquarium such that the ratio of the amount of water to the amount of animal life approaches the ratio found in the sea. There is so much water per pound of sea life in the ocean that any attempt to approach that ratio precludes having a small aquarium.

The root problem in salt water aquarium chemistry is that the principle component of the excretion of fish and invertebrates is ammonia. Ammonia is highly toxic. Some sea animals cannot exist in water that contains as much as 0.1 ppm (as total $NH_4+$) ammonia in solution.

There are a number of species of chemoautotropic bacteria which need ammonia to survive. Nitrosomonas bacteria process ammonia, $NH_3$, and convert it to nitrite, which is less toxic to most sea life, although only a limited number of species can survive in an environment high in nitrite. Further, bacterial action by nitrobacter bacteria convert nitrite to nitrate. The nitrate is slightly toxic to some species, but a more difficult problem is that nitrates can enter into chemical reactions with other materials to form harmful compounds, and to diminish the alkaline reserve and decrease pH. However, there is a partial solution for that problem. The water in a salt water aquarium is filtered continually through an agregate material that rests at the bottom of the aquarium. It simulates the bottom of the sea and includes materials that dissolve to improve water chemistry.

The waste converting bacteria grow on the surface of objects in the sea, and they are found on the surface of the fish and other marine animals that are introduced into the aquarium. As water is circulated through the agregate at the bottom of the tank, some of that bacteria is circulated with tank water and becomes lodged in the filration bed, and begins to form colonies on the surface of the agregate particles of the filtration bed. In time, those colonies grow in proportion to the available nutrient supply. The nutrient is ammonia and nitrite. The result is that the bacterial colonies grow until they are capable of processing all of the ammonia and nitrate. A time as long as two, three, or more, weeks is required for a culture to develop adequately. In practice, rough or inexpensive fish are introduced into the aquarium and the filration system started. After two or three weeks, some of the rough fish are removed and the aquarium is restocked with the animals that are to be permanent residents of the aquarium. In an alternative, but often less satisfactory, procedure, a culture of waste converting bacteria are added to the tank water in lieu of live animals.

Certain ions, particularly metallic ions, are harmful to some species, but it is relatively easy to avoid introducing metals and other harmful substances into the aquarium. What cannot be avoided is the introduction of food. An aquarium owner can be expected to add any of a wide variety of fish and invertebrate food preparations, and he can be expected to add them in larger quantities than necessary or desirable. Green plants, particularly lettuce, are often introduced into a tank. The gross residue is usually removed, but small particles may remain.

Thus, in addition to the ammonia, the tank can be expected to contain solid waste and unused particles of fresh vegetation and commercial fish food preparations, animal matter and preservative chemicals. These substances are available for a chemical reaction with another, with nitrite or nitrate, with the filter material, and possibly with the minerals of rocks or other articles that are introduced into the tank to enhance the aesthetic quality of the aquarium.

The chemical environment in the tank is a function of many more variables, but the standard practice has been to attempt to control only the ammonia content by the introduction of waste converting bacteria and the resulting pH level by using a filter bed that includes soluable carbonates. Those procedures are not enough. In practice, they are supplemented with a schedule of partial water changes. In what is probably the most popular schedule, ten percent of the tank water is replaced monthly. The sudden change that results from replacement of a substantial portion of the water whose chemistry much more closely simulates natural sometimes produces a shock sufficiently severe to destroy an invertebrate animal. Even if the animal survives, its resistance to the action of disease bacterial may be greatly lowered.

Because of their sensitivity to changes in water chemistry, it is common not to attempt to place invertebrates with fish, but rather to place the invertebrates in separate tanks. One of the objects of the invention is to provide an aquarium system in which water control is so well maintained that it is feasible to combine fish and invertebrates in the same tank wherein the fish can live indefinitely and the invertebrates can live indefinitely, or at least for long periods of time. Another object is to provide an aquarium system in which mobile bacteria are killed and in which stationary bacterial are not harmed. It is an object to provide a system in which some of the ammonia is removed mechanically without reliance on the bacterial action on the filter. Another object is to provide an aquarium system in which surface active organic materials which are produced by bacterial composition are removed mechanically in a process that tends also to remove non-surface active waste products.

These and other objects and advantages of the invention are realized in part by the provision of an aquarium system based on the conventional system for circulating tank water through an agregate at the tank bottom in which waste processing bacteria colonies may be formed. However, the water flow pattern is changed to facilitate distribution of food. In addition, the invention inludes means for removing entrained or dissolved gas particles, particularly ammonia gasses, and it includes a means for absorbing materials that result in discoloration of the water or the creation of odors.

These elements are included in a unique circuit arrangement in which each element of water chemistry control is separately accomplished so it can be optimized, and in the several elements, are accomplished in an order which makes one complement the other.

An aquarium system which embodies the invention in preferred form is shown in the accompanying drawings, in which.

Figure 1:
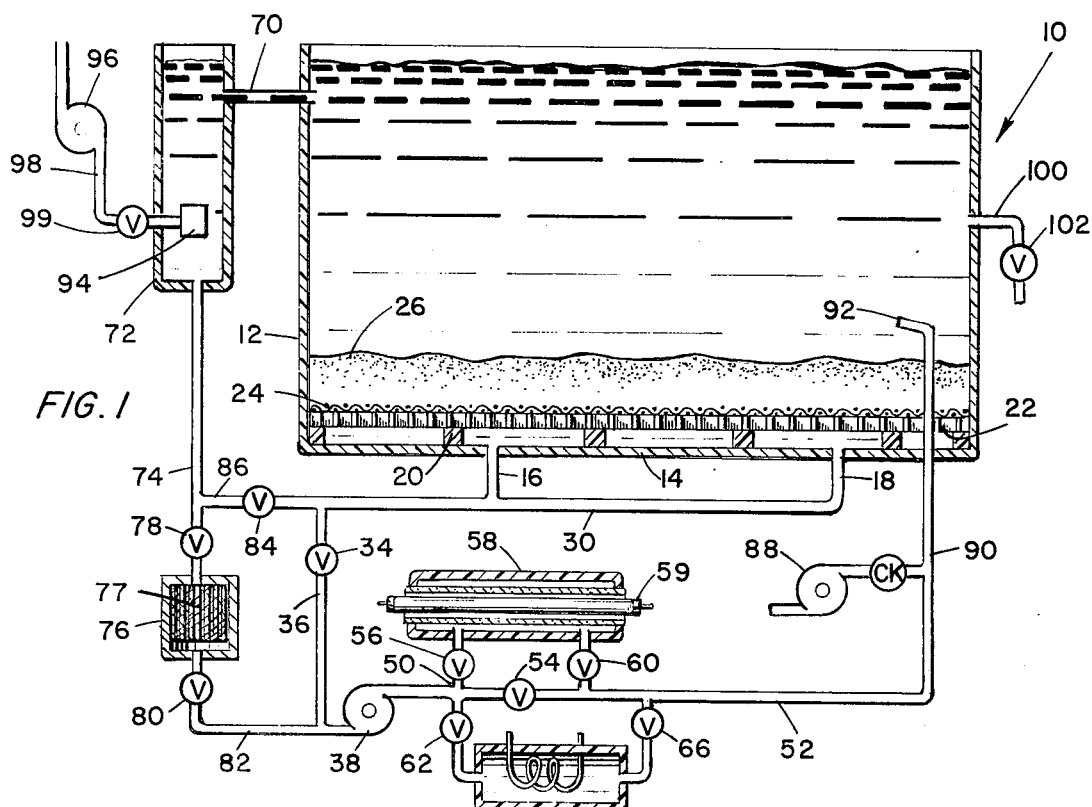
FIG. 1 is a schematic drawing of an aquarium system which embodies the invention.

The aquarium system shown in FIG. 1 is intended for use in systems in which all of the aquarium water is stored in a single display tank whose capacity might be anything from twenty to one-thousand gallons or more. The system shown is also applicable to aquarium systems that employ a central water processing tank together with a number of satellite display tanks. Such a system may be variously arranged. One arrangement uses what is shown in FIG. 1 as the water processing system. To this is added a feed line to an auxillary tank and a return line from that auxillary tank. A circulating pump is included in one of those lines.

In FIG. 1, the system is generally designated by the reference numeral 10. It includes a water tank 12 which may have almost any shape except that it advantageously has a flat bottom, such as the bottom 14. Ordinarily, the tank is made of a transparent material, either glass or plastic so that the marine life may ve viewed through its walls.

Figure 5:
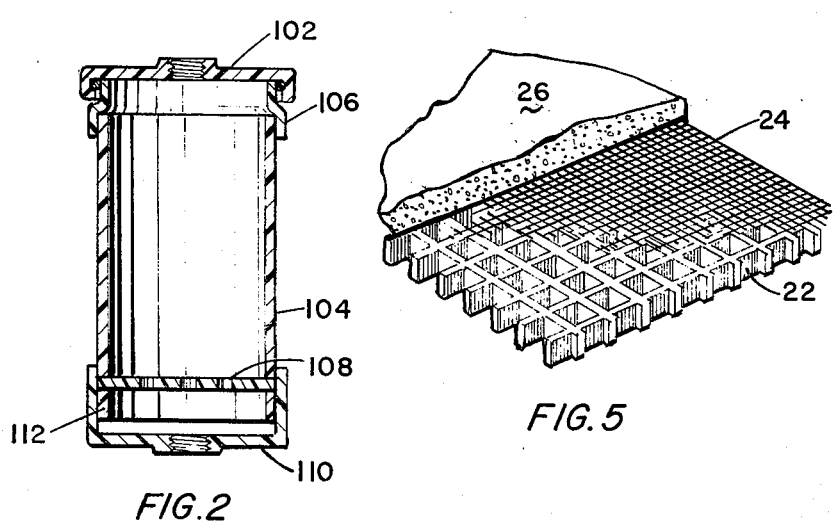
FIG. 5 is an exploded view of the elements of the filtration system shown at the bottom of the tank in FIG. 1.

A filtration bed is installed in the bottom of the tank. That filtration bed can be seen in FIG. 1, and elements of it can be seen in an expanded view in FIG. 5. The upper layer of the filter comprises particulate matter. Silica sand may be employed, but crushed coral or oyster shell, or other soluable carbonate material, such as dolomite, is prefered because it aids in maintaining the pH of the proper range. Another function of the particulate matter in this embodiment is to trap excess food particles and solid excrement so that it will be held in the filter bed where it can be subjected to bacterial action. The particle size is selected to promote that action. Even more, however, particle size is selected so that the bacteria colonies that account for ammonia processing can best survive. Particle grains that will pass through a screen with five millimeter mesh spacing and which will not pass through a screen of two millimeter mesh spacing is preferred. The bed should be at least two inches thick.

Water must move through the filter bed freely. The best arrangement thus far discovered for insuring an adequate flow is to support the particulate matter on a non-metallic, plastic screen whose mesh is small enough to prevent the passage of the filter material. The screen, in turn, is supported by a non-metallic grid whose openings are anywhere from one-sixteenth or an inch to one-fourth of an inch in area. The grid is mounted on supports 20 that provide free flow of water from all the areas of the filter bed to an outlet in the tank bottom.

Multiple outlets are preferred, although that is not essential. In the embodiment shown, there are two outlets, 16 and 18, formed in the bottom wall 14 of the tank. A number of supports, or spacers, 20 hold a sheet-like plastic grid 22 at a distance of about one-half inch from the bottom. A pictorial showing of that grid 20 appears in FIG. 5. In this case, the grid is formed as a series of perpendicular walls that define one-half inch square spaces. The grid itself is about one-half inch thick. A sheet of plastic screening 24 overlies the grid 20. Plastic of the kind that is employed in screen windows is entirely satisfactory. The screen is folded down at its outer margins and back under the supports. In the preferred embodiment, the screen is bonded to the support. The layer 26 of filter material rests atop the screen. One of the advantages of this arrangement is that the filter material may be stirred and raked about, if that is necessary, to break up larger particles of unused food whereby to hasten decomposition.

Decomposition is accomplished by bacteria other than those that process ammonia. They, too, form colonies in the filter material. On the other hand, bacteria of the kind that gives rise to illness in sea animals is ordinarily mobile. That kind of bacteria, the kind that circulates with the water, is destroyed in an ultra-violet environment that is included in the circuit.

The circuit arrangement forms part of the invention. Some variation is possible, but what is shown is the preferred arrangement. Water leaving the tank by way of outlet 16 or 18 passes to a collection conduit 30 from whence it passes through normally open shut-off valve 34 to line 36 and pump 38. The pump discharges to a junction 50 in a return line 52. That line includes a normally closed valve 54. One branch line leads from junction 50 through a normally open valve 56 to the inlet of an ultra-violet sterilizer 58. An outlet line from the sterilizer 58 returns water through normally open valve 60 to return line 52 at a point downstream from valve 54.

Another branch line from junction 38 delivers part of the flow through a normally open valve 62 to a temperature changer, here a heater 64, and back to return line 52 downstream from valve 54 through normally open valve 66. The sterilizer and temperature changer are in parallel here so that the volume of flow through the heater can be controlled relative to flow through the sterilizer.

A second circulating path begins at a point above the sub-gravel filter. A conduit 70 connects from a point just below the low water level line of the tank to a point near the upper end of a special air stripper 72. A line 74 at the lower end of the air stripper conducts water to a chemically active filter 76 through a normally open valve 78. Water flows from the filter 76 through a normally open valve 80 to line 82 which joins line 36 at the inlet of pump 38. There is a bypass valve 84 in a line 86 that connects lines 74 and 30. The bypass valve is normally closed.

Water circulation is used in the process of aeration, water chemistry control, distribution of food to immobile animals, separating out solid matter, and to create a movement of water for those animals whose life processes require it. To serve these several functions, the circulation system must operate continuously. For that reason, the elements of the system that might need to be removed for more than a very short time have shut-off valves in their input and output lines. Thus, valves 56, 60, 62, 66, 78 and 80 are included so that the sterilizer, heater and active filter can be removed for repair. When the filter 76 is removed, valve 84 is opened; when either or both the heater and sterilizer are removed, valve 54 is opened.

Air is added to the circulating water at a point downstream from the heater and sterilizer and filter and the pump. An air pump 88 forces air into the water stream at junction 90. The air-water mixture is returned to the tank at a point above the sub-gravel filter 26 near one end of the tank 12. It is introduced by a flow director 92 which directs the water across the tank, preferably across its length toward the inlet of the air stripper. It is customary to introduce air, or air and water, through an airstone which divides the air into many small bubbles to promote dissolution. There is no objection to the use of some mechanical means for that purpose, but that means should not diffuse the flow of return water. To return a strong stream of water that causes eddy currents in most parts of the tank near the bottom is a feature of the invention. Many invertebrates require a definite water movement to bring food to them and are acclimated to such water movement. The fish can go to the food, but the food must be brought to the invertebrates.

The need for a definite water flow is also related to the scheme for controlling water chemistry. The air stripper of the preferred embodiment employs a flow of water counter to the flow of air. Since air flows up, the water must flow down. In the invention, water is delivered to the stripper from the top of the tank and the return water current is used to insure good circulation to the stripper inlet of the materials which the stripper is to remove.

The air stripper 72 includes an air stone or other diffuser 94 near its lower end. Air is introduced to the diffuser by a pump 96 and its outlet line 98, and the amount of air is controlled by a metering valve 99. The function of the flow disperser 94 is to divide the air into minute bubbles. Surface active organic materials produced by bacterial decomposition elsewhere in the tank tend to surround the bubble at the air-water interface. These organic substances are then carried upwardly with the bubble and the result of that action is the creation of a foam at the top. The foam inludes not only the surface active organics, but it will also include non-surface active materials that are attracted to these surface active materials. Thus, the bubble carries both surface active and non-surface active waste products up into an upper foam where it remains until cleaned away periodically.

The action of the air stripper is particularly important. It does not remove large particles of excess food. Presumably, if the fish is not harmed by eating the food, it will not be harmed by having quantities of that food remain in the tank. What can be harmful are the decomposition products of that food resulting from bacterial action in the filter bed. If those products leave the filter bed and become dispersed in the water, then ultimately most of them will be drawn into the air stripper where they can be removed.

Bubbling air through the tank water provides a number of advantages. It is the means by which oxygen is placed in solution in tank water, or is entrained in it. Oxygen must be introduced because all of the marine life that can be maintained in an aquarium is aeorbatic. In addition, air bubbles flowing upwardly through the water capture entrained ammonia gasses and carry them out of the tank. In a process not well understood, even dissolved ammonia can be removed in this fashion so that bubbling air through the tank water is an important element in the removal of ammonia. The air bubbling through the air stripper accomplishes these functions.

Air may be introduced into this system at a number of points, but the most advantageous arrangement is shown in FIG. 1 where air is introduced into the line 52 by an air pump 88 which simply draws air in from the atmosphere. Thus, in the preferred form, air is introduced into the system after the tank water has passed through the carbon filter and the sterilizer and the heater.

In the event that water from this tank is to be used in a satellite tank, the preferred arrangement is to draw water from a point substantially above the filter bed. For that purpose, the tank shown includes an outlet conduit, 100, located in the mid-region of the tank height. That opening is closed by a valve 102 except when the system is connected to the satellite. Water is ordinarily returned from the satellite through the top of the tank, so no return connection is shown. Valve 102 is normally closed.

There are three filters in this system. The first is the gravel bed 26. Its function is to entrap solid waste material and food that settles to the bottom of the tank. It has the additional, important function that it serves as the situs for the waste processing bacteria colonies.

The second filter is the air stripper. As previously described, small particles of solid materials that float, and some of the liquid and gaseous products of decomposition, are removed in that device. The third filter element is the active chemical unit. Its function here is not much different than the function that active carbon filters are ordinarily required to perform. It absorbs entrained gasses, odors, color, nitrates, and fine suspended solids. The air stripper filter and the active chemical filter are arranged in series. Together, the are arranged in parallel with and are connected in parallel with the sub-gravel filter 26.

The sterilizer 52 is in series with, and downstream from, all three filters. It consists of a housing surrounding and spaced from an ultra-violet lamp. The lamp is energized from an electrical source not shown. The pumps and the heater are also electrically operated, although the electrical power source and controls are not illustrated. The heater 58 is connected in series with the three filters and in parallel with the ultra-violet sterilizer.

Figure 2:
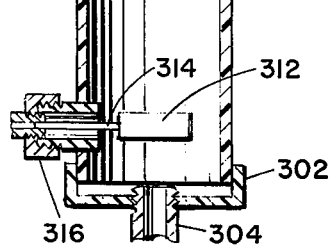
FIG. 2 is a view in vertical cross-section of a carbon filter that is used in the system of FIG. 1.

It is important that the ionic content of the tank water be controlled. It is particularly important to control the metallic ions. That is done by making chemical additions of required or desirable substances directly to the tank water. To avoid the introduction of unwanted metallic ions, the entire plumbing system is made of non-metallic, inert material. Polyvinyl chloride plastic plumbing is particularly advantageous. The entire plumbing system shown in FIG. 1 is made of plastic. Thus, in FIG. 2, the carbon filter holder comprises a cylindrical body 104 fitted with an upper end cap 102 which has a central, threaded opening to accomodate a threaded inlet conduit. In this embodiment, the end cap is formed by a shallow cup which is held by a bayonette connector on to the end of an adaptor whose other end is telescoped over the upper end of the body 104. The adaptor is identified by the reference numeral 106. The lower end of the body 104 rests upon a circular plastic grate 108 whose purpose is to hold the carbon filter material spaced from the outlet opening formed in the lower end cap 110. A spacer sleeve 112 holds the grid 108 away from the bottom wall of the lower cap. The sides of the cap extend up above the spacer and the grid and the lower margin of the body 104. The lower end cap and the body may be bonded together as shown. The upper end cap is removable to permit replacement of the filter material 77 (see FIG. 1).

Figures 3, 4:
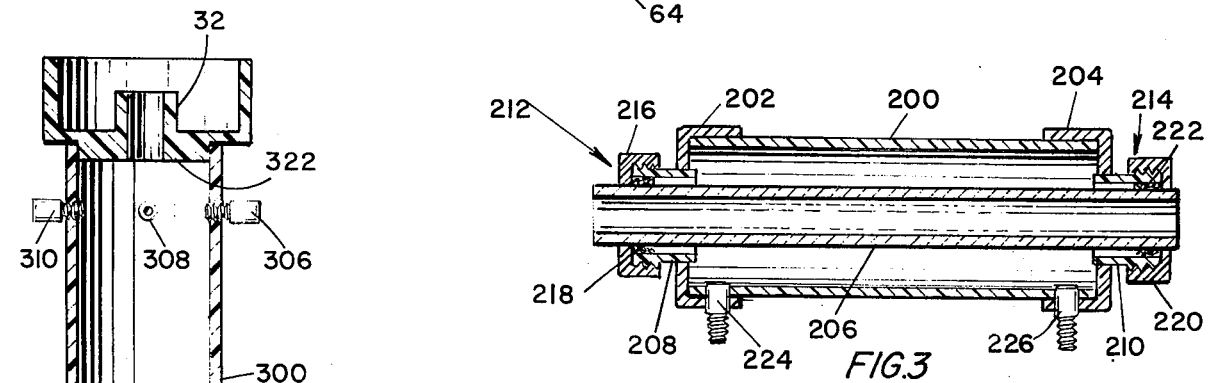
FIG. 3 is a view in central cross-section of an ultraviolet sterilizer unit which is incorporated in the system of FIG. 1.
FIG. 4 is a view in central section of an air stripper that is used in the embodiment of FIG. 1.

The sterilizer is shown in FIG. 3. Its body is formed by an elongated cylindrical member 200 and is fitted with an end cap 202 at the left end, in FIG. 3, and an end cap 204 at the opposite end. Those elements are bonded together to form a waterproof structure. Both end caps are formed with a large axial bore in which a lamp holder is assembled. The unit is constructed for use with tubular germicidal lamps whose illumination is rich in ultra-violet radiation. The holder comprises a central, transparent quartz sleeve 206 whose outside diameter is less than the inside diameter of the outer sleeve 200, thus to provide a flow path for the circulating water. The sleeve 206 is transparent to ultra-violet radiation. Its inner diameter is such that the lamp is easily accomodated.

An end retainer is fitted over each end of the transparent sleeve 206, and is threaded onto an outwardly extending cylindrical sleeve support. Both supports are bonded in the large opening of a respectively associated end cap and each is provided with external threads. Support 208 extends to the left. Support 210 extends to the right. The retainer at the left is identified, generally, by the reference numeral 212, and the one at the right is identified by the reference numeral 214. Both comprise a clamp cap which screws on one of the support cylinders, and in the process, squeeze a packing sleeve between the support and transparent sleeve. Clamp cap 216 is at the left with packing seal 218. Clamp cap 220 and packing seal 222 are at the right. An inlet nipple 224 is bonded in an opening that extends through outer sleeve 200 and end cap 202. An outlet nipple 226 is bonded in an opening at the other end in the sleeve 200 and cap 204. The lamp is simply inserted into the transparent sleeve 206 and power lines are clamped on the lamp terminals.

The air stripper unit is shown in FIG. 4. It consists of a cylindrical sleeve 300 whose lower end is fitted into, and bonded to, an end cap 302. That end cap is formed with a central threaded opening into which the threaded end of an outlet conduit 304 is threadedly engaged. The model shown includes three inlet conduits spaced 90 degrees apart at the same level. The conduits are identified by the reference numerals 306, 308 and 310. The form and number is not significant except to show that inlet water should be brought into the air stripper at a point near its upper end and that it should be introduced in a way that prevents laminar flow downwardly through the air stripper. Operation of the stripper is enhanced by increasing the degree of contact between the water and the air bubbles which are introduced at a low point in the unit. Air is released into an air stone, or other air disperser 312. That air disperser is mounted upon the end of an inlet tube 314 which is mounted on a threaded inlet cap 316. This model is provided with an upper cover 322 in the form of a foam retainer cup. The foam enters through a column 324 which is re-entrant into the cup.

One of the features of the invention lies in the improved means it incorporates for holding the bed of particulate matter. When, as in the invention, the gravel of the bed comprises particles of a two to five millimeter size, some of the small particles of unused food will penetrate the filer bed to appreciable depth. Thus, there will be a vertical separation of entrapped particles through the bed. Nonetheless, it is advantageous to have a wide horizontal separation as well because greater separation permits faster decomposition. Accordingly, the preferred arrangement uses a bed that has a relatively large surface area. That arrangement is not fully effective, however, unless water circulation proceeds through all or most of the area of that surface. The invention includes a special means for holding the particulate matter relative to the tank outlet so that a relatively uniform flow of water through the entire area of the bed is achieved. That holding means comprises a grid made of non-metallic material, and advantageously is made of plastic. Where, as in the case shown, the tank has a flat bottom, the grid has the form of a plate which extends over the entire bottom. The plate is foraminated. Its openings extend from one side of the plate to the other so that the plate offers little resistance to flow. In the embodiment shown, the plate comprises a grid of plastic walls that define rectangular openings. This particular form is not essential, although it has a number of advantages. Plastic grid plates of that kind are manufactured in different thicknesses with different opening sizes. The thickness is not critical. For tanks of one hundred gallons and less, thickness of one-fourth to one-half inch is adequate. The opening size is more important. The preferred opening has a cross-sectional area of between one-sixteenth and one-fourth of a square inch. In the case of grids with rectangular openings, that means the openings would have a dimension from one-fourth to one-half inch on a side. Those openings are much larger than the particle size. To prevent the particles from entering into the openings of the grid, a mesh or screen material is employed. The preferred material is the kind of plastic screen material that is commonly used in screen windows and screen doors. The opeings in that kind of material are rectangular and approximately one-sixteenth of an inch on the side.

Although I have shown and described certain specific embodiments of my invention, I am fully aware that many modifications thereof are possible. My invention, therefore, is not to be restricted except insofar as is necessitated by the prior art.

I claim:

1. In an aquarium system of the kind that includes a tank having a lower outlet and an inlet and a bed of particulate material disposed in said tank above said outlet and below said inlet, the improvement which comprises, in combination:

- holding means for holding said bed of particulate material such that the flow of water above said bed to said outlet proceeds through said bed;
- main flow path means comprising a flow path for receiving tank water from said outlet and returning it to said tank at said inlet;
- pumping means in said flow path for pumping tank water from said outlet to said inlet;
- an active chemical filter and an ultraviolet irradiation sterilizer in series with one another and with said pump in said flow path at a point below said tank; and
- an air stripper filter and air stripper filter flow path means for directing water from said tank at a point above said bed through said air stripper filter and delivering it to said main flow path means at a point upstream from said pumping means.

2. The invention defined in claim 1 in which water flowing through said air stripper flows in a direction counter to air movement in the air stripper.

3. The invention defined in claim 2 in which water flowing through said air stripper is introduced into said flow path at a point upstream from said active chemical filter.

4. In an aquarium system of the kind that includes a tank having a lower outlet and an inlet and a bed of particulate material disposed in said tank above said outlet and below said inlet, the improvement which comprises, in combination:

- holding means for holding said bed of particulate material such that the flow of water above said bed to said outlet proceeds through said bed;
- main flow path means comprising a flow path for receiving tank water from said outlet and returning it to said tank at said inlet;
- pumping means in said flow path for pumping tank water from said outlet to said inlet;
- an active chemical filter and an ultraviolet irradiation sterilizer in series with one another and with said pump in said flow path at a point below said tank;
- an air stripper and means for directing water from a point in said tank above said bed downwardly through said air stripper and for introducing that water into said main flow path at a point upstream from said active chemical filter and said pumping means;
- said air stripper including means for introducing air bubbles at a point below the point of entrance of water into said stripper whereby air bubbles flow counter to the flow direction of water through said air stripper filter;
- means for introducing air into said main flow path at a point upstream from said pump, said active filter, and said sterilizer; and
- said bed of particulate matter comprising a soluable carbonate.

* * * * *